July 26, 1955 E. JONES 2,714,177
TELEVISION RECEIVER
Filed Feb. 5, 1952
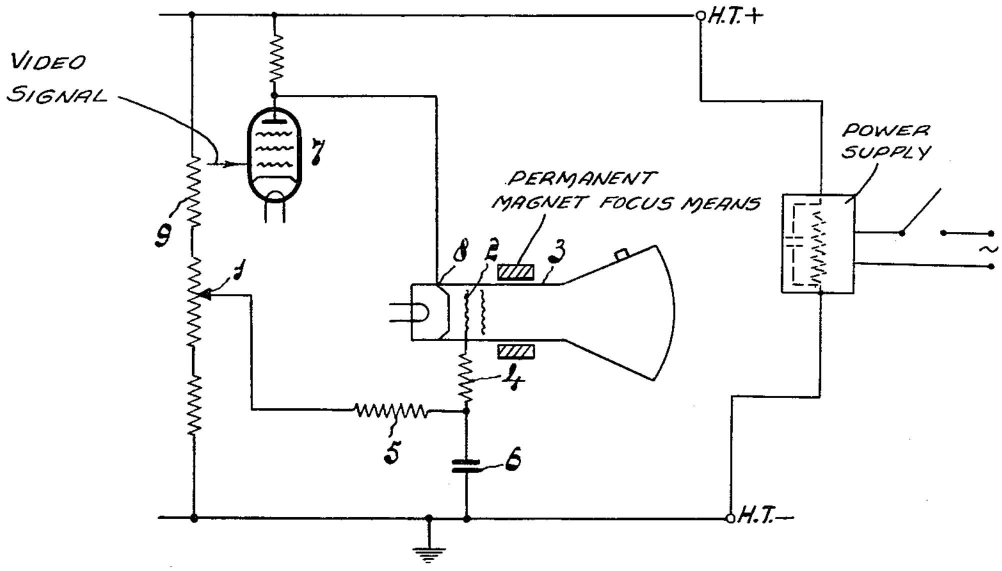
INVENTOR
Emlyn Jones
By Fred M Vogel
Agent

United States Patent Office 2,714,177

Patented July 26, 1955

2,714,177

TELEVISION RECEIVER

Emlyn Jones, Horley, England, assignor to Hartford National Bank and Trust Company, Hartford, Conn., as trustee Application February 5, 1952, Serial No. 270,065

Claims priority, application Great Britain February 9, 1951

3 Claims. (Cl. 315—20)

This invention relates to a television receiver comprising a cathode-ray tube employing permanent magnet focussing of the cathode ray-beam.

Hitherto receivers of this kind had a limitation in that on switching off the receiver after a period of use the cathode ray-beam tended to persist due in part to the fact that the cathode of the tube retains its temperature for some more time and in part to the fact that the charge of the E. H. T. smoothing capacitor flows away only slowly.

In the case of a receiver having a permanent magnet as the means of focussing this results in that the scanning spot remains stationary on the cathode ray-tube screen which is thus liable to damage.

This effect is most marked if the receiver is switched off with the brilliance control at its minimum position or when there is no modulation and hence no cathode ray beam.

On the receiver being switched off the same potential is effective at the cathode and the control grid of the cathode ray beam so that as a result of the persistence of the high voltage the cathode ray beam restarts after the time bases have ceased to function.

The object of the invention is to provide a television receiver in which this disadvantage does not occur or does not occur to any appreciable extent.

The television receiver according to the invention is characterized in that the receiver comprises means which ensure that on the receiver being switched off the cathode ray beam substantially discharges the E. H. T. capacity of the cathode ray tube before the collapse of the line and frame deflecting oscillations.

In order that the invention may be clearly understood and readily carried into effect it will now be described in detail with reference to the accompanying drawing, in which one embodiment of a television receiver according to the invention is shown.

The figure only shows part of a receiver comprising a cathode ray-tube 3. The television signal required to be reproduced occurs across the output circuit of the discharge tube 7 and is fed to the cathode 8 of the cathode-ray-tube. The control grid 2 of the cathode ray-tube is coupled via the series combination of resistors 4 and 5 to a slider 1 on a potentiometer circuit 9 which is connected to the anode supply source which on one side is connected to earth potential.

The junction of the resistors 4 and 5 is also connected to earth potential via a capacitor 6.

The R-C network formed by the capacitor 6 and the resistor 5 has such a time constant that on the receiver being switched off the potential of the control grid 2 does not vary in the same manner as the potential of the cathode but, as a result of the combined action of the charge across the capacitor 6 and the voltage set up across the resistor 4 current continues to flow in the cathode ray-tube and this causes the E. H. T. capacitor (not shown) to be discharged before the collapse of the line and frame deflecting oscillations.

For the sake of completeness it is remarked that these oscillations do not collapse instantaneously on the receiver beam switched off since the cathodes of the time base valves retain their temperature for a short time and in addition to supply source continue for a short time to supply voltage.

What I claim is:

1. In a television receiver which utilizes a permanent magnet for focussing a cathode-ray beam and wherein a switch is provided for cutting off power to a power supply filter network which has a capacitive element for sustaining a high constant positive potential to attract the electrons in said beam, apparatus comprising a cathode ray tube having a cathode, a control grid and an anode coupled to said capacitive element, means for supplying a video signal to said cathode, and means coupled to said control grid for reducing the intensity of said cathode-ray beam for at least a predetermined period commencing substantially at the instant whenever said switch cuts off the power to said network.

2. Apparatus as set forth in claim 1 wherein said means coupled to said control grid includes a resistance capacitance network.

3. In a television receiver which utilizes a permanent magnet for focussing a cathode-ray beam and wherein a switch is provided for cutting off power to a power supply filter network which has a capacitive element for sustaining a high constant positive potential to attract the electrons in said beam, apparatus comprising a cathode ray tube having a cathode, a control grid and an anode coupled to said capacitive element, a video signal amplifier having an anode circuit coupled to said cathode, and a screen protecting circuit coupled to said control grid, said protecting circuit including a potentiometer having an adjustable tap and a resistive element connected between a source of positive potential and ground, a first resistor connected at one end to said control grid, a second resistor connected between said tap and the other end of said first resistor and a capacitor connected between the junction of said first and second resistors and ground, whereby the potential of the cathode of said cathode ray tube is always positive an the positive potential of said control grid is always less than that of said cathode.

References Cited in the file of this patent

UNITED STATES PATENTS

| | | |
|---|---|---|
| 2,119,372 | Wendt | May 31, 1938 |
| 2,261,776 | Poch | Nov. 4, 1941 |
| 2,280,670 | Spielman | Apr. 21, 1942 |
| 2,303,924 | Faudell | Dec. 1, 1942 |
| 2,336,837 | Bedford | Dec. 14, 1943 |
| 2,416,687 | Fry | Mar. 4, 1947 |
| 2,635,208 | Cage | Apr. 14, 1953 |
| 2,638,562 | Schipper et al. | May 12, 1953 |